(12) United States Patent
Beaty (10) Patent No.: US 9,662,754 B2
(45) Date of Patent: May 30, 2017

(54) AUTOMATIC FASTENER DRIVING SYSTEM, APPARATUS AND METHOD

(71) Applicant: Honda Motor Co., Ltd., Tokyo (JP)

(72) Inventor: Eric L. Beaty, Troy, OH (US)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 14/504,099

(22) Filed: Oct. 1, 2014

(65) Prior Publication Data
US 2016/0096242 A1    Apr. 7, 2016

(51) Int. Cl.
| B23P 19/00 | (2006.01) |
| B25B 23/10 | (2006.01) |
| B25B 23/06 | (2006.01) |
| B23P 19/06 | (2006.01) |

(52) U.S. Cl.
CPC ............ *B23P 19/005* (2013.01); *B25B 23/06* (2013.01); *B25B 23/103* (2013.01); *B23P 19/002* (2013.01); *B23P 19/003* (2013.01); *B23P 19/006* (2013.01); *B23P 19/06* (2013.01); *Y10T 29/49881* (2015.01); *Y10T 29/49947* (2015.01); *Y10T 29/49963* (2015.01)

(58) Field of Classification Search
CPC ..... B23P 19/006; B23P 19/007; B23P 19/001; B23P 19/002; B23P 19/003; B23P 19/06; B23P 119/005; B25B 23/10; B25B 23/02; B25B 23/04; B25B 23/06; B25B 23/08; B25B 23/103; B25B 21/00; Y10T 29/49947; Y10T 29/49963; Y10T 29/49881
See application file for complete search history.

(56) References Cited

U.S. PATENT DOCUMENTS

| 2,973,021 | A | * | 2/1961 | Crossen | ............... B25B 13/481 7/901 |
| 3,283,791 | A | * | 11/1966 | Weber | ..................... B25B 23/04 81/432 |
| 3,314,458 | A | * | 4/1967 | Weber | ..................... B25B 21/00 81/430 |
| 3,583,451 | A | * | 6/1971 | Dixon | .................... B23P 19/006 29/240 |
| 3,760,485 | A | * | 9/1973 | Smith | ................... B23P 19/006 29/813 |
| 3,891,014 | A |   | 6/1975 | Aoyama | |
| 3,918,533 | A | * | 11/1975 | Weber | ..................... B25B 21/00 173/155 |
| 4,114,663 | A | * | 9/1978 | Viner | ..................... B25B 23/04 221/263 |
| 4,463,889 | A | * | 8/1984 | Sartran | ................... B25B 23/04 221/233 |
| 5,031,489 | A | * | 7/1991 | Young | ................... B23P 19/003 227/112 |
| 5,088,359 | A | * | 2/1992 | Hockman | ............. B23P 19/006 81/433 |
| 5,098,003 | A | * | 3/1992 | Young | ...................... B25C 1/04 227/114 |
| 5,186,084 | A | * | 2/1993 | Totsu | .................... B23P 19/006 81/431 |

(Continued)

*Primary Examiner* — Sarang Afzali
(74) *Attorney, Agent, or Firm* — Rankin, Hill & Clark LLP (57) ABSTRACT

A fastener driving system, apparatus and method includes a receiver into which the fastener is deposited and a torqueing device extendable into the receiver for applying powered torque to the fastener to install the fastener into the associated work piece.

16 Claims, 6 Drawing Sheets

(56) References Cited

U.S. PATENT DOCUMENTS

| | | | |
|---|---|---|---|
| 5,233,151 A | 8/1993 | Aoyama | |
| 5,239,900 A * | 8/1993 | Macris | B23P 19/006 227/48 |
| 5,248,058 A * | 9/1993 | Aoyama | B23P 19/006 221/165 |
| 5,291,645 A | 3/1994 | Aoyama | |
| 5,295,295 A * | 3/1994 | Aoyama | B23P 19/006 29/813 |
| 5,385,434 A * | 1/1995 | Quinn | B23P 19/003 198/399 |
| 5,480,087 A * | 1/1996 | Young | B23P 19/003 221/268 |
| 6,341,542 B1 * | 1/2002 | Ade | B23P 19/006 81/433 |
| 6,550,359 B1 * | 4/2003 | Graham | B23P 19/006 81/431 |
| 7,178,432 B1 * | 2/2007 | Han | B25B 23/10 227/112 |
| 8,347,766 B2 * | 1/2013 | Ota | B23P 19/003 81/430 |
| 8,424,420 B2 | 4/2013 | Ranta | |
| 8,800,409 B1 * | 8/2014 | Wuester, Sr. | G11B 25/043 81/430 |
| 9,067,285 B2 * | 6/2015 | Ota | B23P 19/006 |
| 9,079,275 B2 * | 7/2015 | Ota | B23P 19/005 |
| 2002/0078557 A1 | 6/2002 | Watanabe et al. | |
| 2010/0059541 A1 | 3/2010 | Hsu | |
| 2011/0209589 A1 * | 9/2011 | Ota | B23P 19/003 81/430 |
| 2011/0252927 A1 * | 10/2011 | Ota | B23P 19/005 81/430 |
| 2012/0067176 A1 * | 3/2012 | Ota | B23P 19/006 81/57.37 |
| 2016/0096242 A1 * | 4/2016 | Beaty | B23P 19/06 29/525.11 |

* cited by examiner

AUTOMATIC FASTENER DRIVING SYSTEM, APPARATUS AND METHOD

BACKGROUND

Many conventional automatic fastener devices are known. In most conventionally known tools, a threaded bolt is fed into the tool in a thread-first orientation. The tool is typically oriented into a vertical direction so that the threaded bolt drops into jaws of the tool which hold the threaded bolt for engagement with a work piece. Conventionally known tools of this type are usually large and heavy, also expensive to install and operate. An additional drawback of these types of known tools is that insertion of the threaded bolt into the tool in the thread-first orientation can result in damage to the threaded bolt (e.g., to the threads of the threaded bolt).

BRIEF DESCRIPTION

According to one aspect, an automatic fastener driving system includes a fastener supplying device for supplying a fastener in a head first orientation, a transfer device operatively connected to the fastener supplying device for transferring the fastener, and a fastener driving apparatus operatively connected to the transfer device for receipt of the fastener in the head first orientation. The automatic fastener driving apparatus includes a receiver into which the fastener is deposited upon transfer by the transfer device, an alignment device mounted to the receiver for aligning the fastener with an associated work piece, and a torqueing device extendable into the receiver for applying powered torque to the fastener to install the fastener into the associated work piece.

According to another aspect, an automatic fastener driving method is provided. In the method according to this aspect, a fastener is supplied in a head first orientation. The fastener is transferred in the head first orientation to a fastener driving apparatus. The fastener is deposited within a receiver of the automatic fastener driving apparatus. The fastener is aligned with an associated work piece. Powered torque is applied to the fastener to install the fastener into the associated work piece.

According to a further aspect, a fastener driving apparatus includes a support and a receiver secured to the support. The receiver defines a chamber for receiving a fastener therein and includes a first opening and a second opening positioned opposite the first opening. The apparatus further includes a carriage, a torqueing device and at least one linear actuator. The torqueing device is secured to the carriage. The torqueing device includes a motor and a fastener engagement tool operably connected to the motor. The tool is received in the chamber through the first opening. The at least one linear actuator is operably connected to the support and the carriage. The linear actuator is moveable between an extended position and a retracted position, wherein retraction of the actuator from the extended position moves the carriage with respect to the housing and advances the tool through the chamber toward the second aperture to engage the fastener positioned in the chamber and advance the fastener out of the second opening.

According to a still further aspect, a fastener driving device includes a torque device having a fastener engagement member extending therefrom. The device also includes a housing defining a chamber and including a first aperture for receiving the engagement member and a second aperture positioned opposite the first aperture for passage of a fastener from the chamber to a work piece. The housing is movable from a fastener receiving position wherein the fastener engagement member is positioned a first distance from the second aperture, to a fastener installation position wherein the fastener engagement member is positioned in the chamber a second distance from the second aperture that is less than the first distance.

DETAILED DESCRIPTION

Figure 1:
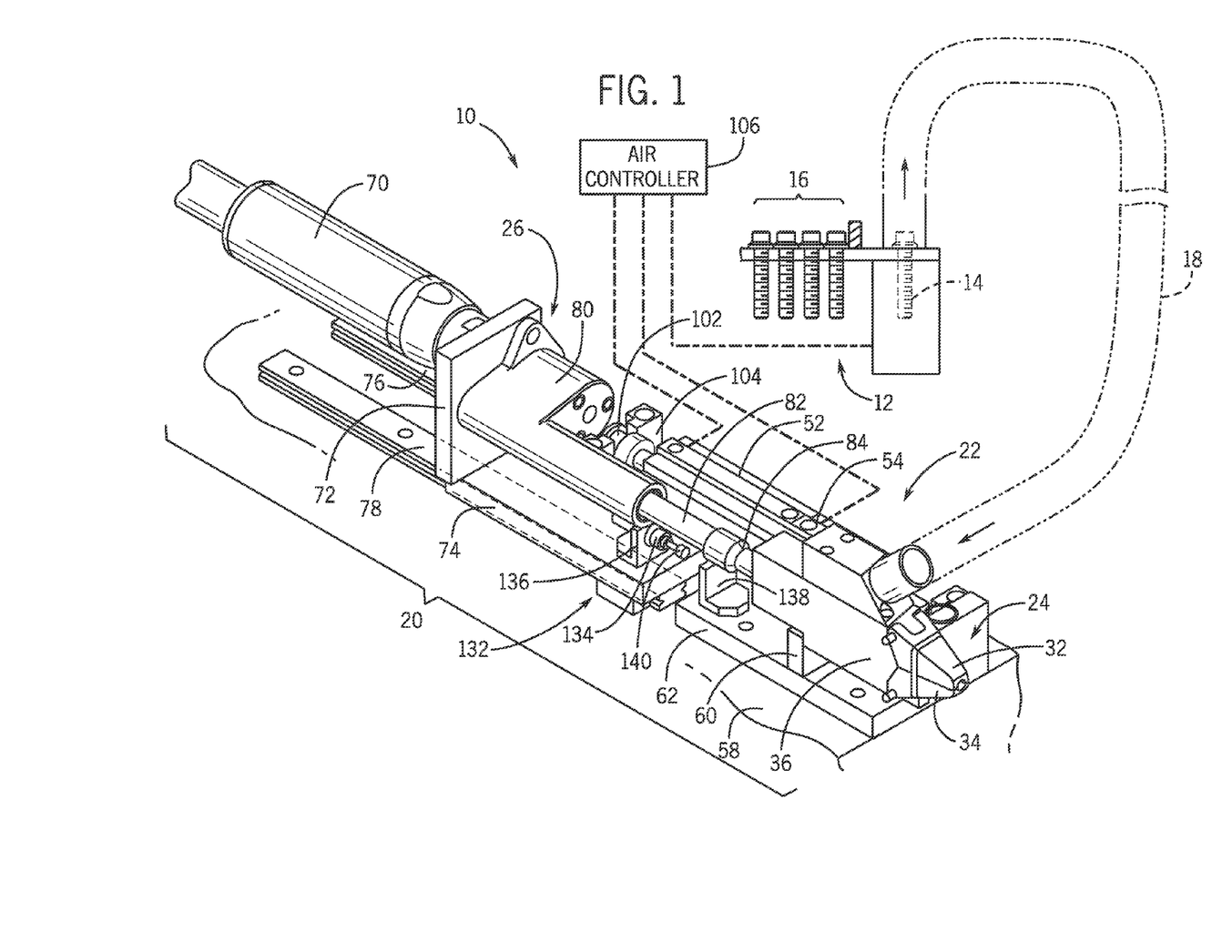
FIG. 1 is a perspective view, partially schematic, of an automatic fastener driving system including a fastener driving apparatus according to an exemplary embodiment.

With reference now to the figures wherein the showings are for purposes of illustrating one or more exemplary embodiments and not for purposes of limiting the same, FIG. 1 illustrates an automatic fastener driving system 10 according to an exemplary embodiment and generally indicated by reference numeral 10. The system 10 can include a fastener supplying device 12 for supplying a fastener 14 from a plurality of fasteners 16 in a head first orientation and is connected to a transfer device 18 that is operatively connected to the fastener supplying device 12 for transferring the fastener 14. The system 10 includes a fastener driving apparatus 20. The fastener driving apparatus 20 may be operatively connected to the transfer device 18 for receipt of the fastener 14 in the head first orientation. The transfer device 18 in the illustrated embodiment is or includes a transfer tube through which the fastener 14 is transferred via pneumatic force (e.g., in the head first orientation).

As will be described in more detail below, the automatic fastener driving apparatus 20 includes a receiver 22, an alignment device 24 and a torqueing device 26. With additional reference to FIGS. 2 and 3, the transfer device 18 can connect to the receiver 22 at an acute angle relative to a direction in which the fastener 14 is installed into an associated work piece 28 (i.e., the direction in which the alignment device 24 points). The receiver 22 into which the fastener 14 is deposited upon transfer by the transfer device 18 has the alignment device 24 mounted thereto for aligning the fastener 14 with the associated work piece 28. As will also be described in more detail below, the torqueing device 26 is extendable into the receiver 22 for positioning the fastener 14 and applying powered torque to the fastener 14 to install the fastener 14 into the associated work piece 28.

Figures 2, 3:
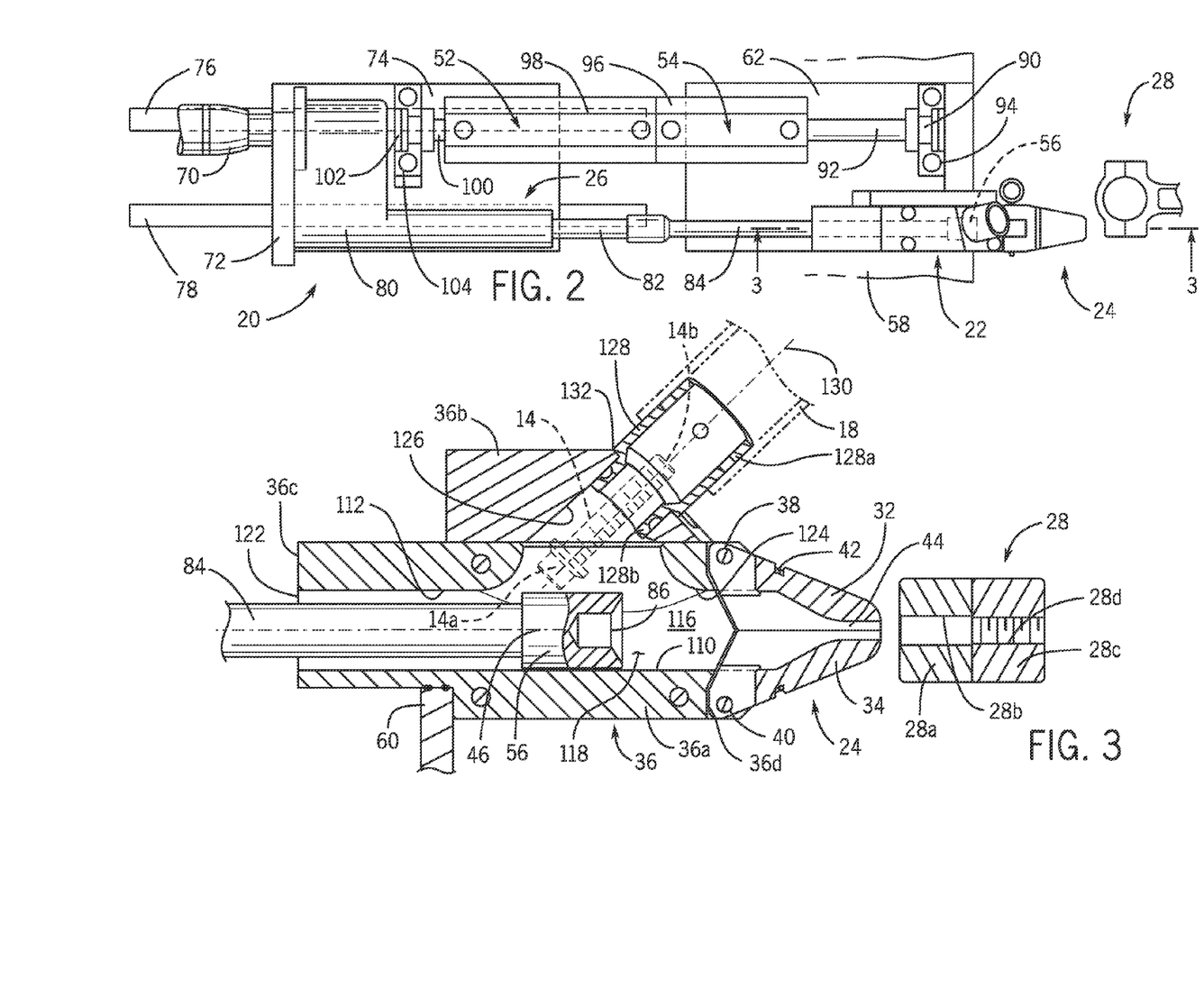
FIG. 2 is a top plan view of the automatic fastener driving apparatus shown in position to install a fastener from a receiver of the apparatus into an associated work piece.
FIG. 3 is a partial cross-sectional view taken at the line 3 of FIG. 2.

The alignment device 24 can be a set of jaws 32, 34 disposed at a location that is interposed between the receiver 22 and the associated work piece 28. As shown, the transfer device 18 directs the fastener 14 into the receiver 22 at an acute angle on the same side of the receiver 22 as where the set of jaws 32, 34 are disposed. More particularly, the jaws 32, 34 can include the jaw 32 as an upper jaw pivotally mounted to a housing 36 of the receiver 22 via pivot pin 38 and the jaw 34 can be a lower jaw pivotally mounted to the housing 36 below the upper jaw 32 via a pivot pin 40. The jaws 32, 34 can be urged towards respective closed positions by a suitable urging device, which in the illustrated embodiment is a resilient O-ring 42 annularly received around the jaws 32, 34. The jaws 32, 34 define a through passage 44 that is aligned with the associated work piece 28.

More particularly, in one embodiment, the associated work piece 28 can include a first work piece member 28*a* defining a fastener aperture 28*b* and a second work piece member 28*c* defining a threaded fastener aperture 28*d*. As shown, the apertures 28*b* and 28*d* of the associated work piece 28 can be in registry with one another so as to be ready to receive the fastener 14 from the apparatus 20. In particular, the through passage 44 is aligned with the apertures 28*b*, 28*d* and thus serves to align the fastener 14 to be passed therethrough with the apertures 28*b*, 28*d* of the work piece 28. More specifically, when the fastener 14 is driven through the jaws 32, 34, this occurs against the urging of the jaws 32, 34 toward the respective closed positions by the resilient O-ring 42.

As shown, the receiver 22 can be arranged and/or oriented such that it receives the fastener 14 at an acute angle relative to a horizontal axis 46 along which the fastener 14 is installed into the associated work piece 28 and reorients the fastener 14 for travel along the horizontal axis 46. The alignment device 24 is arranged to precisely align the fastener 14 along the horizontal axis 46 during the installation operation of the fastener 14 into the work piece 28. For installing the fastener 14 into the work piece 28, the torqueing device 26 is linearly moveable into and out of the receiver 22.

More particularly, the torqueing device 26 is moveable into the receiver 22 for engaging the fastener 14 after the fastener 14 is received in the receiver 22, linearly moving the fastener 14 into the jaws 32, 34, linearly moving the fastener further into the work piece 28, operable to apply powered torque to the fastener 14 to rotate the fastener into the work piece 28 and retractable from the receiver 22 after installation of the fastener 14 into the work piece 22. For such linear movement of the torqueing device 26 into and out of the receiver 22, the apparatus 20 additionally includes at least one linear actuator (e.g., cylinders 52, 54 in the illustrated embodiment) for linearly moving an engaging or socket end 56 of the torqueing device 26 into and out of the receiver 22. Although the cylinders 52, 54 are shown as pneumatic cylinders, it is to be understood that they are not limited to such, as any type of linear actuator may be used. In the illustrated embodiment, the at least one actuator includes a long stroke cylinder 52 that selectively advances and retracts the torqueing device 26 relative to the receiver 22 a first distance (i.e., a stroke distance of the long stroke cylinder 52) and a short stroke cylinder 54 that selectively advances and retracts the torqueing device 26 relative to the receiver 22 a second distance (i.e., a stroke distance of the short stroke cylinder 54) that is less than the first distance.

In the illustrated embodiment, the receiver 22 is fixed to a support structure 58 and the torqueing device 26 is slidably mounted to the support structure 58 so as to be movable relative to the support structure 58 and thus movable relative to the receiver 22 that is fixed to the support structure 58. As shown in the illustrated embodiment, the housing 36 of the receiver 22 can be fixedly secured (e.g., via welding) to a vertically oriented plate 60 which is itself fixedly secured (e.g., via welding) to a horizontally oriented mounting plate 62. As shown, the mounting plate 62 can be fixedly secured directly to the support structure 58, such as by bolts. One or more of the support structure 58, the vertically oriented plate 60 and/or the support plate 62 can be sized to assist in positioning the alignment device 24 relative to the associated work piece 28 as the associated work piece is brought into position for installation of the fastener 14 therein. It is to be understood, however, that the present disclosure is not limited to such configurations as the torqueing device 26 may be fixed and the receiver 22 may be slidably mounted.

The torqueing device 26 can include a powered rotation driving device 70 mounted to a vertically oriented plate 72 that is itself fixedly mounted (e.g., via welding) to a horizontally oriented carriage or support plate 74. Non-limiting examples of the driving device 70 include electric and pneumatic motors. In a non-limiting example, the support plate 74 is slidably mounted via tracks or guides 76, 78 to the support structure 58. By sliding along the guides 76, 78, the support plate 74 and the various components mounted thereto are slidably movable relative to the support structure 58 and thus to the receiver 22. A reduction housing 80 can also be mounted to the vertically oriented support plate 76 and operatively connected to the powered rotation driving device 70 as is known and understood by those skilled in the art. An extending member 82 can protrude outwardly toward the receiver 22 from the reduction housing 80. A fastener engagement tool, such as a socket member 84 having the socket end 56 distally disposed thereon, can be operatively connected to the extending member 82. As shown, the socket end 56 can include a socket aperture 86 appropriately sized for complementarily engaging a head portion 14*a* of the fastener 14 (e.g., see FIG. 7).

For moving the support plate 74 relative to the fixed support plate 62, the cylinders 52, 54 can be operatively connected to the plates 62, 74. In the illustrated embodiment, a distal end 90 of a piston portion 92 of the short stroke cylinder 54 can be fixedly mounted to the fixed support plate 62 by engagement with a vertical wall portion 94 that is itself fixedly secured (e.g., via welding or bolting) to the fixed support plate 62. The piston portion 92 is arranged to extend and retract from and into a housing portion 96 of the short stroke cylinder 54. The housing portion 96 can be arranged in abutting end-to-end relation with a housing portion 98 of the long stroke cylinder 52. In one embodiment, distal ends of the housing portions 96, 98 of the cylinders 52, 54 are welded to one another. Like the short stroke cylinder 54, the long stroke cylinder 52 can include a piston portion 100 arranged to extend and retract into the housing portion 98. A distal end 102 of the piston portion 100 can be fixedly secured to the movable support plate 74 by a vertical wall portion 104 that is itself fixedly secured to the movable support plate 74 (e.g., via welding or bolting). As shown schematically in FIG. 1, the cylinders 52, 54 can be operatively connected to an air controller 106 that selectively provides pneumatic power to the cylinders 52, 54 as is known and understood by those skilled in the art for controlling actuation of the cylinders 52, 54.

Figure 10:
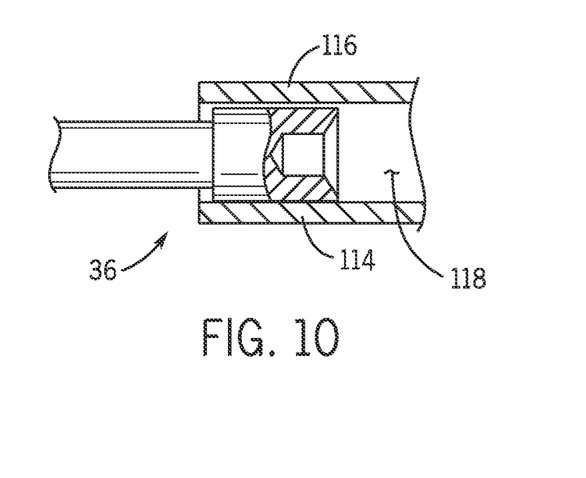
FIG. 10 is a horizontal cross-section view of the receiver of the automatic fastener driving apparatus.

With additional reference to FIG. 10, the housing 36 of the receiver 22 includes a plurality of static walls 110, 112, 114, 116 that together define a chamber 118 for receiving the fastener 14. In particular, the wall 110 is a lower wall of the chamber 118 and the wall 112 is an upper wall of the chamber 118. The walls 114 and 116 form side or lateral walls of the chamber 118. The chamber 118 has a chamber longitudinal axis that can be the same as the horizontal axis 84. As shown, the housing 36 can be formed of a main housing portion 36a and an auxiliary housing portion 36b. Optionally, the main housing portion 36a and the auxiliary housing portion 36b can be formed integrally but are shown as being formed as separate pieces parts in the illustrated embodiment. As shown, the auxiliary housing portion 36b further forms the upper wall 116.

In the illustrated embodiment, a first opening 122, which can also be referred to as a torqueing device opening, is defined in the housing 36 and connected to the chamber 118. The first opening 122 is disposed along the chamber longitudinal axis 84 at a first end 36c of the housing 36 (i.e., end of the housing that faces the torqueing device 26). The first opening 122 is specifically arranged to receive the socket end 56 of the torqueing device 26. A second opening 124, also referred to herein as an install opening, is defined in the housing 36 and connected to the chamber 118. The second opening 124 is disposed along the chamber longitudinal axis 84 at a second end 36d of the housing 36 opposite the first opening 122 and the first end 36a. The second opening 124 is arranged to receive the fastener 14 when the fastener 14 is installed into the associated work piece 28.

A third opening 126, which can also be referred to as a transfer opening, is defined in the housing 36 (and more particularly in a combination of the main housing portion 36a and the auxiliary housing portion 36b) and is connected to the chamber 118. The third opening 126 is arranged to receive the fastener 14 from the transfer device 18 and to deliver the fastener 14 to the chamber 118. In the illustrated embodiment, the transfer device 18 is a tube annularly received about an outward end 128a of an adapter 128 with an install end 128b of the adapter operatively and sealingly connected to the auxiliary housing portion 36b in an open end of the third opening 126.

As shown, the third opening 126 has a third opening longitudinal axis 130 arranged obliquely or acutely relative to the chamber longitudinal axis 84. In particular, the third opening longitudinal axis 130 is arranged at an acute angle (e.g., approximately 45 degrees) relative to the chamber longitudinal axis 84 such that an open end 132 of the third opening 126 faces generally toward the associated work piece 28 and away from the torqueing device 26. By this arrangement, the first and second openings 122, 124 are disposed along the chamber longitudinal axis 84 and a third opening 126 is disposed along the third opening longitudinal axis, which can also be referred to as a transfer opening longitudinal axis, that is acutely oriented relative to the chamber longitudinal axis 84 and arranged to face toward the associated work piece 28.

The apparatus 10 can further include a shock absorber assembly 132. In the illustrated embodiment, the assembly 132 includes a shock absorber 134 mounted to a mounting plate 136 fixedly secured to the movable plate 74 and a contact plate 138 fixedly secured to the fixed plate 62. When the cylinders 52, 54 are moved to their respective retracted positions, a bumper 140 of the shock absorber 134 engages the contact plate 138 to slow down movement of the plate 74 and thus the socket end 56 relative to the plate 62 and the receiver 22. While the shock absorber 134 is shown mounted to the plate 74, the arrangement could be reversed to have the shock absorber 134 mounted to the fixed plate 62, or some other shock assembly could be used.

In FIGS. 2 and 3, the long stroke cylinder 52 is in its retracted state and the short stroke cylinder 54 is in its extended state. This positions the socket end 56 of the torqueing device 26 immediately below the third opening 126 so that the head portion 14a of the fastener 14 first contacts the socket end 56 as it falls into the chamber 118. The threaded portion 14b is arranged to trail the head portion 14a during delivery to the chamber 118 as already indicated herein. By positioning the socket end 56 immediately below the third opening 126, receipt of the fastener 14 into the chamber 118 can occur without inadvertently causing the fastener 14 to flip its orientation (i.e., have the head portion 14a forwardly disposed toward the work piece 28 in the chamber 118 with the threaded portion 14b disposed to be engaged by the socket end 56). This may be particularly advantageous where the fastener 14 has a smaller longitudinal dimension and thus might be more susceptible to flipping within the chamber 118 absent positioning of the socket end 56 immediately below the third opening 126.

Figures 4, 5:
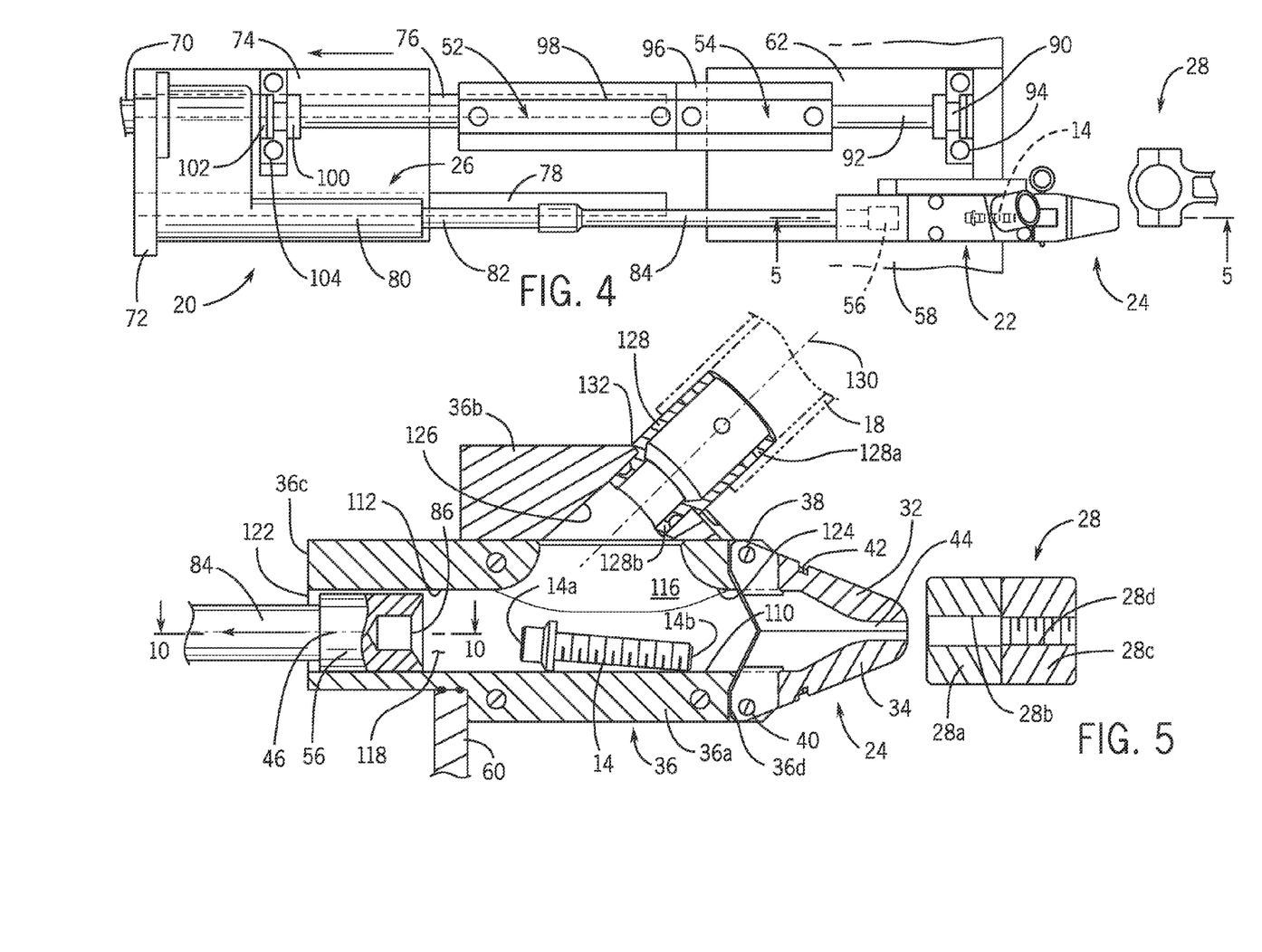
FIG. 4 is a planned view similar to FIG. 2 but shown with long and short cylinders of the automatic fastener driving apparatus both in respective extended positions (only the short cylinder is shown in the extended position in FIG. 2).
FIG. 5 is a cross-sectional view taken at the line 5 of FIG. 4.
Figures 6, 7:
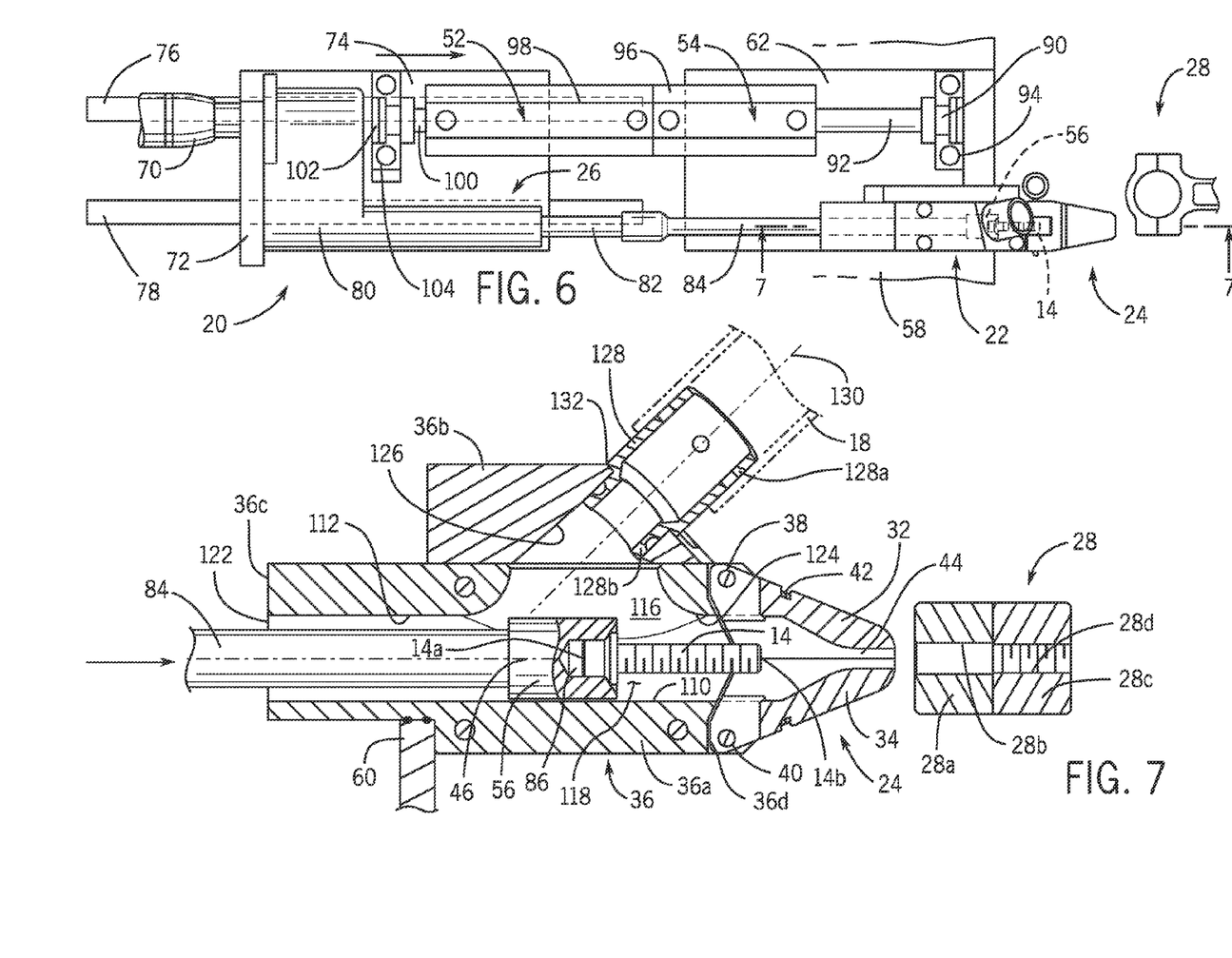
FIG. 6 is a plan view similar to FIG. 4 but shown with the long cylinder returned to a retracted position (same position as shown in FIG. 2) and shown with a fastener pushed into an alignment device of the automatic fastener driving apparatus.
FIG. 7 is a cross-section view taken at the line 7 of FIG. 6.

Next, the long stroke cylinder 52 can be moved to its extended state as shown in FIGS. 4 and 5. This retracts the socket end 56 from the chamber 118 allowing the fastener 14 to be fully received within the chamber 118. Once the fastener 14 is fully received within the chamber 118, the long stroke cylinder 52 can be returned to its retracted state thereby causing the socket end 56 to move further into the receiver 22. As this occurs, the socket end 56 fully and complementarily engages the head portion 14a of the fastener 14, in part as the threaded portion 14b of the fastener 14 reaches the alignment device 24. This is shown in FIGS. 6 and 7.

Figures 8, 9:
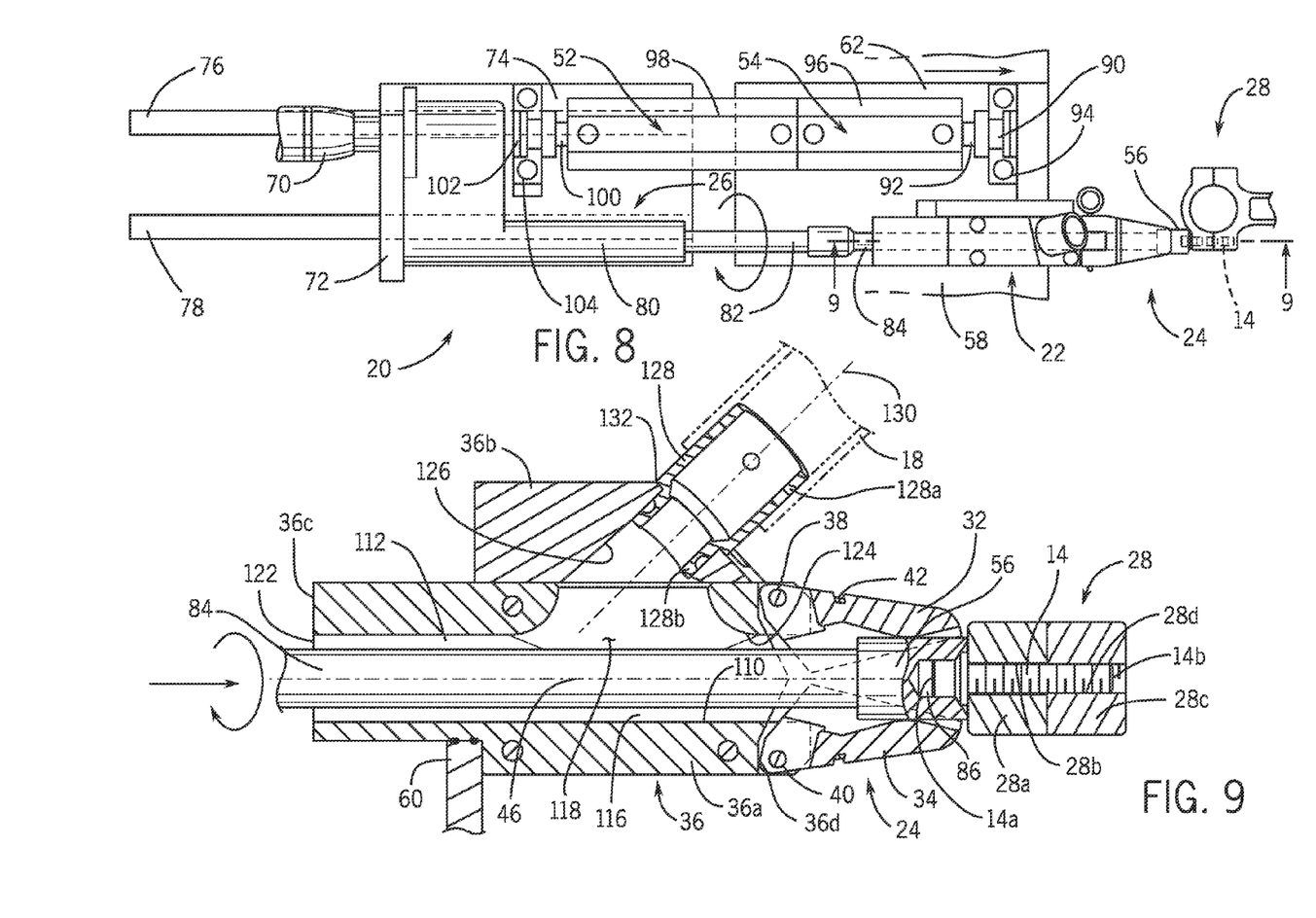
FIG. 8 is a plan view similar to FIG. 6 but shown after the short cylinder is moved to a retracted position to drive the fastener into the associated work piece while the fastener is rotated by a torqueing device of the automatic fastener driving apparatus.
FIG. 9 is a cross-section view taken at the line 9 of FIG. 8.

Next, the short stroke cylinder 54 can be moved to its retracted state to further move the socket end 56 into the receiver and toward the work piece 28. Simultaneous with movement of the short stroke cylinder toward its retracted state, the torqueing device 26, and particularly the powered rotation driving device 70 thereof, can rotate so as to rotatably thread the fastener 14 into the work piece 28. Once the fastener 14 is installed, as shown in FIGS. 8 and 9, the short stroke cylinder 54 can be returned to its extended state shown in FIGS. 2 and 3 so as to again position the socket end 56 below the third opening 126 to ready the apparatus 20 for receipt of the next fastener from the fastener supplying device 12.

Figure 11:
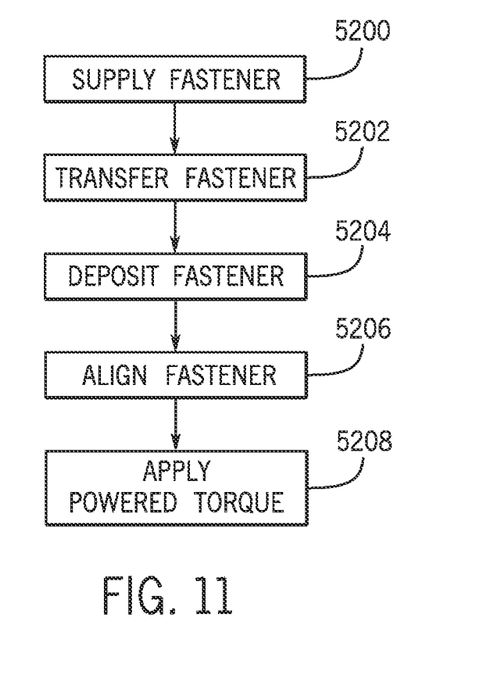
FIG. 11 is a process flow diagram illustrating an automatic fastener driving method according to an exemplary embodiment.

With reference to FIG. 11, an automatic fastener driving method will now be described according to an exemplary embodiment. In particular, the method of FIG. 11 will be described in association with the system 10 and apparatus 20 described hereinabove, though it is to be appreciated that the method could be used with other systems and/or apparatus. As shown in FIG. 11, at S200, the method first includes the step of the fastener 14 being supplied in a head first orientation. Next, at S202, the fastener 14 is transferred in the head first orientation to the automatic fastener driving apparatus 20. As described hereinabove, this is aided by the transfer device 18 which operatively connects the fastener supplying device 12 to the automatic fastener driving apparatus 20. Once transferred in S202, the fastener 14 can be deposited at S204 within the receiver 22, and particularly within the chamber 118 of the receiver 22, both of the automatic fastener driving apparatus 20.

Then, as described above, the cylinders 52, 54 can be operated to work together with the alignment device 24 to align the fastener 14 with the associated work piece 28 as indicated at S206. Then, as indicated at S208, powered torque can be applied via the power rotation device 70 to the fastener 14 to install the fastener 14 into the associated work piece 28. The application of powered torque to the fastener 14 at S208 can include moving the torqueing device 28 into the receiver 22 after the fastener 14 is deposited into the receiver 14. Movement of the torqueing device 26, and particularly the socket end 56 thereof, into the receiver 22 can occur as described above in reference to FIGS. 2-9.

Transferring of the fastener 14 to the automatic fastener driving apparatus 20 in S202 can include directing the fastener 14 along a delivery path that is acutely or obliquely oriented (e.g., along the delivery path that extends along the third opening longitudinal axis 130) relative to a direction along which the fastener is installed into the associated work piece 28 (i.e., along the horizontal axis 84). Alignment of the fastener 14 with the associated work piece 28 in S206 can include linearly moving the engaging tool (i.e., socket end 56) a first distance (i.e., the stroke distance of the long stroke cylinder 52) toward the associated work piece 28 to move the fastener 14 into the set of alignment jaws 32,34. Application of the powered torque in S208 to the fastener 14 can include simultaneously moving the engaging tool 56 (or socket end 56) linearly a second distance (i.e., a distance corresponding to the stroke distance of the short stroke cylinder 54) while rotating the fastener 14 via the power rotation device 70 to move the fastener 14 into the associated work piece 28.

As described above, depositing the fastener in the chamber 118 in S204 can include moving the engaging tool or socket end 56 to a location wherein the fastener 14 falls into contact with the engaging tool 56 to maintain the fastener 14 in the head first orientation. Such depositing can additionally include moving the engaging tool 56 the first distance away from the associated work piece 28 to position the fastener 14 fully within the receiver 22 prior to moving the engaging tool 56 the first distance back toward the associated work piece 28.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automatic fastener driving method, comprising:
supplying a fastener in a head first orientation;
transferring the fastener in the head first orientation to a fastener driving apparatus;
depositing the fastener within a receiver of an automatic fastener driving apparatus;
aligning the fastener with an associated work piece; and
applying powered torque to the fastener to install the fastener into the associated work piece, wherein applying powered torque to the fastener includes moving a torqueing device into the receiver after the fastener is deposited into the receiver to engage the fastener,
wherein aligning the fastener with the associated work piece includes linearly moving an engaging tool a first distance toward the associated work piece to move the fastener into a set of alignment jaws and wherein applying the powered torque to the fastener includes simultaneously moving the engaging tool linearly a second distance while rotating the fastener to move the fastener into the associated work piece, and
wherein depositing the fastener within the receiver includes moving the engaging tool to a location wherein the fastener falls into contact with the engaging tool to maintain the fastener in the head first orientation and moving the engaging tool the first distance away from the associated work piece to position the fastener within the receiver prior to moving the engaging tool the first distance toward the associated work piece.

2. The automatic fastener driving method of claim 1 wherein transferring the fastener to the automatic fastener driving apparatus includes directing the fastener along a delivery path that is acutely or obliquely oriented relative to a direction along which the fastener is installed into the associate work piece.

3. An automatic fastener driving system, comprising:
a fastener supplying device for supplying a fastener in a head first orientation;
a transfer device operatively connected to the fastener supplying device for transferring the fastener;
a fastener driving apparatus operatively connected to the transfer device for receipt of the fastener in the head first orientation, the automatic fastener driving apparatus including:
a receiver into which the fastener is deposited upon transfer by the transfer device;
an alignment device mounted to the receiver for aligning the fastener with an associated work piece;
a torqueing device extendible into the receiver for applying powered torque to the fastener to install the fastener into the associated work piece, wherein the torqueinq device is linearly movable into and out of the receiver, the torqueinq device movable into the receiver for engaging the fastener after the fastener is received in the receiver, operable to apply powered torque to the fastener and retractable from the receiver after installation of the fastener into the work piece; and
at least one cylinder for linearly moving a socket end of the torqueinq device into and out of the receiver including a long stroke cylinder that selectively advances and retracts the torqueinq device relative to the receiver a first distance and a short stroke cylinder that selectively advances and retracts the torqueinq device relative to the receiver a second distance that is less than the first distance,
wherein the receiver and the alignment device are arranged relative to one another and configured so that the fastener is deposited into the receiver in the head first orientation and is in spaced apart relation relative to the torqueing device prior to the torqueing device advancing linearly to engage the fastener.

4. The automatic fastener driving system of claim 3 wherein the transfer device is a transfer tube through which the fastener is transferred via pneumatic force.

5. The automatic fastener driving system of claim 4 wherein the transfer tube connects to the receiver at an acute angle relative to a direction in which the fastener is installed into the associated work piece.

6. The automatic fastener driving system of claim 5 wherein the alignment device is a set of jaws disposed at a location that is interposed between the receiver and the associated work piece, and further wherein the transfer tube directs the fastener into the receiver at the acute angle on a same side of the receiver as where the set of jaws are disposed.

7. The automatic fastener driving system of claim 6 wherein the jaws are urged toward respective closed positions and the fastener is driven through the jaws against the urging of the jaws toward the respective closed positions.

8. The automatic fastener driving system of claim 3 wherein the receiver is fixed to a support structure and the torqueing device is slidably mounted to the support structure so as to be movable relative to the support structure.

9. The automatic fastener driving system of claim 3 wherein the receiver and the torqueing device are arranged so that a fastener head of the fastener drops onto an engagement tool of the torqueing device to prevent flipping of the fastener and wherein the torqueing device is retractable after said dropping onto the engagement tool to allow the fastener to fully drop into the receiver in spaced relation relative to the torqueing device.

10. The automatic fastener driving system of claim 3 wherein the receiver includes:
   a housing having a plurality of static walls defining a chamber for receiving the fastener, the chamber having a chamber longitudinal axis;
   a first opening defined in the housing and connected to the chamber, the first opening disposed along the chamber longitudinal axis at a first end of the housing, the first opening arranged to receive an engaging end of the torqueing device;
   a second opening defined in the housing and connected to the chamber, the second opening disposed along the chamber longitudinal axis at a second end of the housing opposite the first opening, the second opening arranged to receive the fastener when the fastener is installed into the associated work piece; and
   a third opening defined in the housing and connected to the chamber, the third opening arranged to receive the fastener from the transfer device and to deliver the fastener to the chamber.

11. The automatic fastener driving system of claim 10 wherein the third opening has a third opening longitudinal axis arranged obliquely relative to the chamber longitudinal axis.

12. The automatic fastener driving system of claim 11 wherein the third opening longitudinal axis is arranged at an angle of about forty-five degrees relative to the chamber longitudinal axis such that an open end of the third opening faces toward the associated work piece.

13. A fastener driving apparatus, comprising:
   a support;
   a receiver secured to the support, the receiver defines a chamber for receiving a fastener therein and includes a first opening and a second opening positioned opposite the first opening;
   a carriage;
   a torqueing device secured to the carriage, the torqueing device including a motor and a fastener engagement tool operably connected to the motor, the tool is received in the chamber through the first opening;
   a first linear actuator operably connected to the support and the carriage, the first linear actuator is moveable between an extended position and a retracted position, wherein retraction of the first linear actuator from the extended position moves the carriage with respect to the housing and advances the tool through the chamber toward the second aperture to engage the fastener positioned in the chamber and advance the fastener out of the second opening; and
   a second linear actuator secured to the first linear actuator, the second linear actuator having a shorter stroke length than the first linear actuator.

14. The fastener driving apparatus of claim 13, wherein the first linear actuator is retracted first and advances the tool through the chamber to engage the fastener, and the second linear actuator is retracted after retraction of the first and advances the tool further through the chamber toward the second opening to advance the fastener out of the second opening.

15. The fastener driving device of claim 14 wherein the motor is actuated during retraction of the second linear actuator.

16. The fastener driving device of claim 15, wherein the first and second linear actuators are pneumatic cylinders.

* * * * *